Sept. 11, 1956  C. M. ASHLEY  2,762,206
DEFROSTING ARRANGEMENTS FOR REFRIGERATION SYSTEMS
Filed Sept. 30, 1952  3 Sheets-Sheet 1

INVENTOR.
Carlyle M. Ashley
BY Herman Seid
Atty.

United States Patent Office 2,762,206
Patented Sept. 11, 1956

2,762,206

DEFROSTING ARRANGEMENTS FOR REFRIGERATION SYSTEMS

Carlyle M. Ashley, Fayetteville, N. Y., assignor to Carrier Corporation, Syracuse, N. Y., a corporation of Delaware Application September 30, 1952, Serial No. 312,332

16 Claims. (Cl. 62—117)

This invention relates to refrigeration systems and, more particularly, to a refrigeration system for use in transportation such as trailers or trucks for cooling the storage compartment thereof, which is provided with defrosting means for removing frost from the evaporator when it collects thereon.

The chief object of the present invention is to provide a refrigeration system which includes means for defrosting the evaporator of the system.

An object of the present invention is to provide a vehicle such as a trailer or a truck which includes a refrigeration system to cool products transported thereby in which the refrigeration system contains means for defrosting the evaporator or for heating the vehicle when required to maintain a desired temperature therein.

A further object of the invention is to provide a defrosting arrangement for the evaporator of a refrigeration system which includes mechanism for raising the compressor discharge pressure to increase the temperature of the compressed gaseous refrigerant thereby rendering such refrigerant suitable for use in defrosting the evaporator of the system. Other objects of my invention will be readily perceived from the following description.

This invention relates to a refrigeration system including a compressor, a condenser, expansion means, an evaporator, and a reevaporator-separator placed in a closed circuit in that order. During normal operation of the system, the evaporator collects frost on its exterior surfaces. Mechanism is provided to maintain the evaporator temperature slightly above 32° F. during defrosting in order to remove the frost from the evaporator surfaces. Such mechanism includes means for inactivating the condenser by filling it with liquid refrigerant during the defrosting operation thereby raising the compressor discharge pressure. Since by proper design of the system, the ratio between compressor discharge pressure and that pressure which corresponds to evaporator temperature is substantially constant, it will be appreciated when the compressor discharge pressure is raised by inactivating the condenser, the corresponding evaporator pressure and temperature rises to a point where the frost is thawed from the evaporator surfaces.

Figure 1:
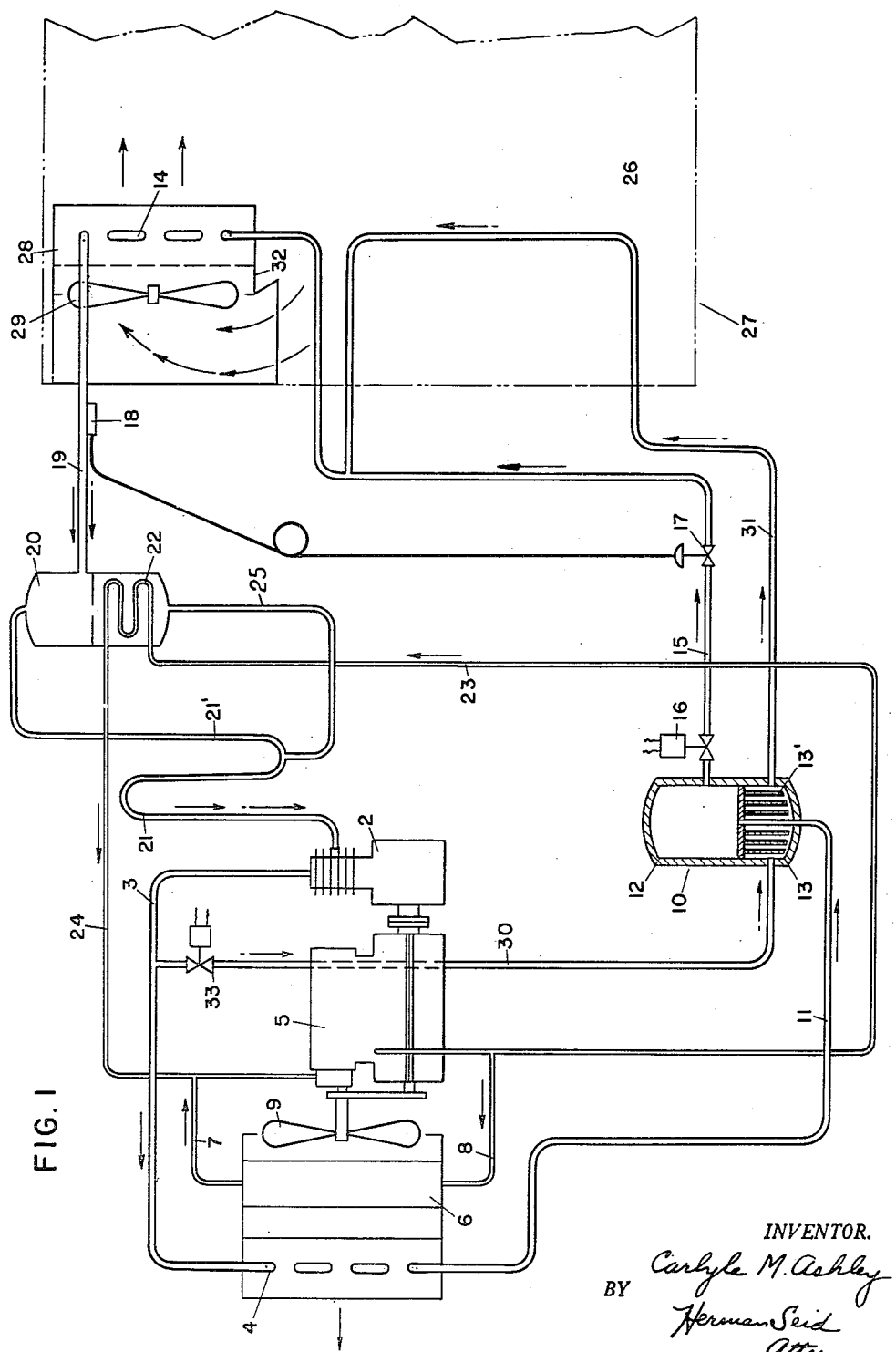
Figure 2:
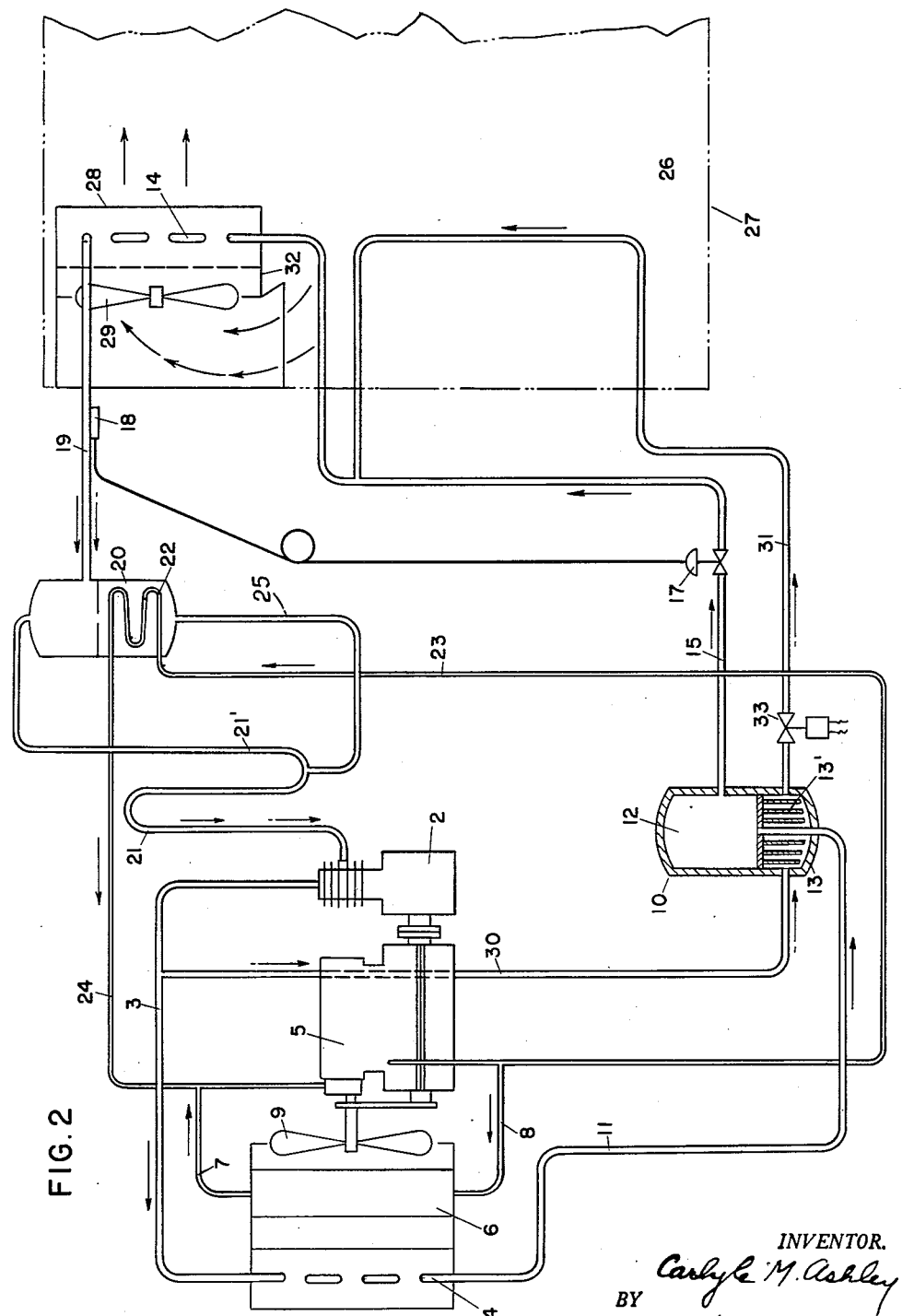
Figure 3:
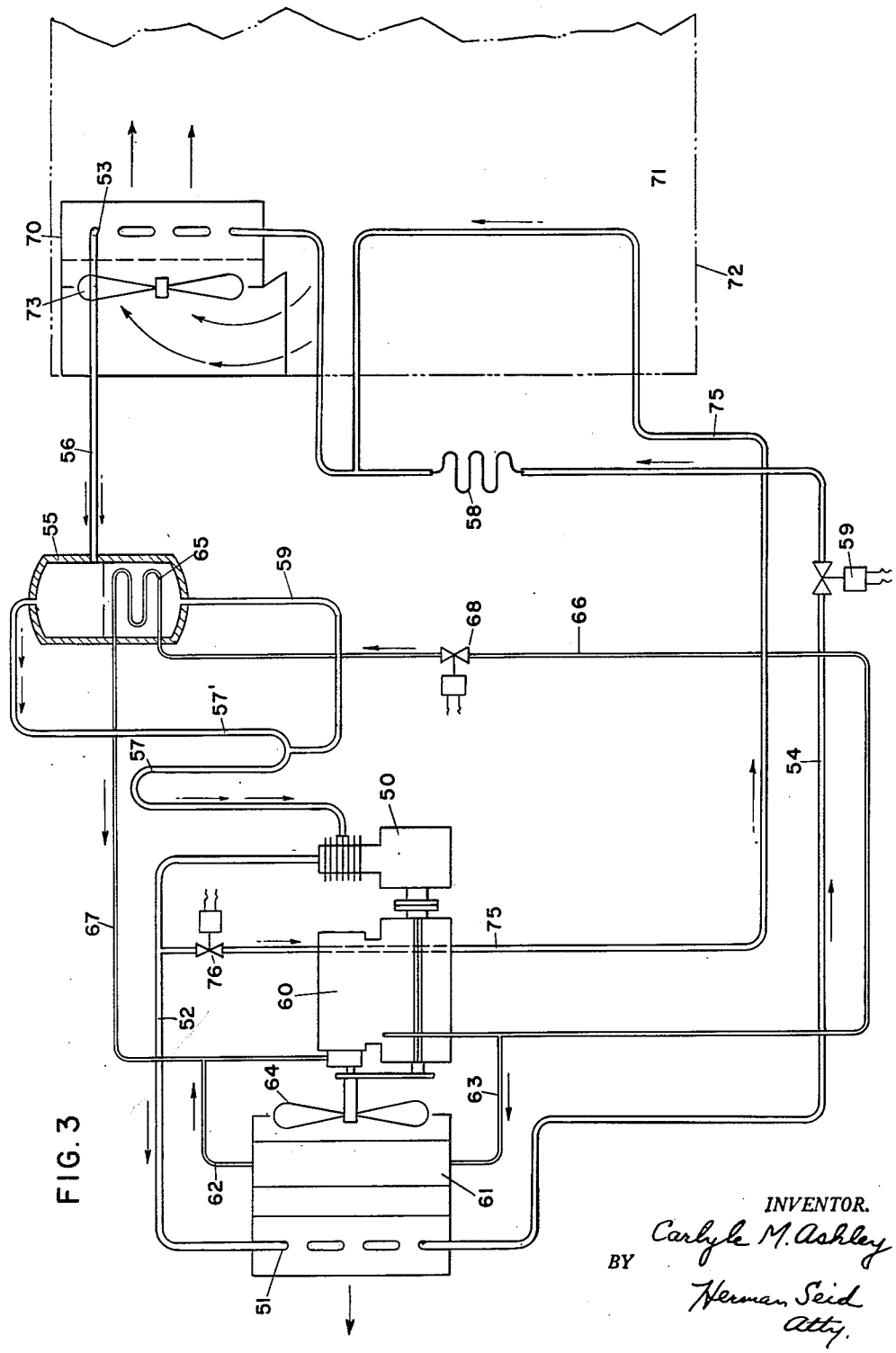

The attached drawings illustrate preferred embodiments of the present invention, in which Figure 1 is a diagrammatic view of a trailer provided with the refrigeration system of the present invention;

Figure 2 is a diagrammatic view similar to Figure 1 of a modification of the invention; and Figure 3 is a diagrammatic view similar to Figures 1 and 2 of a further modification of the invention.

Referring to the drawing, there is shown a refrigeration system which includes a compressor 2 connected by discharge line 3 to a condenser 4. Compressor 2 is driven by an internal combustion engine 5 having its own cooling system. The cooling system of engine 5 includes a radiator 6 connected to the engine by lines 7 and 8. Fan 9 driven by engine 5 passes air through the radiator to cool water therein and through condenser 4 to condense refrigerant supplied therein through line 3.

Condenser 4 is connected to an insulated receiver 10 by line 11. Receiver 10 contains two compartments 12 and 13. Line 11 extends through compartment 13 and opens into compartment 12 to discharge liquid refrigerant from condenser 4 therein. Compartment 12 is connected to evaporator 14 by line 15. A solenoid valve 16, preferably, is placed in line 15. At a point in line 15 between valve 16 and evaporator 14, expansion means such as an expansion valve 17 is located to regulate flow of refrigerant to evaporator 14. Valve 17 is controlled by means of a bulb 18 placed in contact with the suction line 19 of the refrigeration system.

Evaporator 14 is connected to a separator-reevaporator 20 by suction line 19. A line 21 connects separator-reevaporator 20 with compressor 2. A coil 22 is placed in separator-reevaporator 20. Coil 22 is connected to the cooling system of engine 5 by lines 23 and 24. Thus, water which has cooled the engine 5 is then circulated through line 23 to coil 22, returning to the cooling system of the engine through line 24. Preferably, a capillary oil return line 25 connects the bottom of separator-reevaporator 20 with a loop 21' in line 21 to assure that oil collected in the separator-reevaporator is returned to the crank case of the compressor.

Evaporator 14 of the refrigeration system is placed in the storage compartment 26 of a trailer 27 and is contained in a casing 28 therein. A fan 29 is present in casing 28 and serves to draw air from compartment 26 into the casing and to pass such air through evaporator 14 to cool the same thereby maintaining the storage compartment at a desired temperature.

Under some conditions it will be understood that it may be desired to heat the storage compartment 26 instead of cooling the same, or it may be necessary to defrost the evaporator 14 to remove frost collected on the exterior surfaces thereof. For this purpose a line 30 is provided connecting the discharge line 3 with chamber 13 of receiver 10 to permit hot gaseous refrigerant to be passed to compartment 13. Preferably, baffles 13' are provided in compartment 13, for a purpose hereinafter explained. Compartment 13 is connected by a line 31 to line 15 at a point between expansion valve 17 and the evaporator 14. Preferably, a portion of line 31 is passed in heat exchange relation with the drip pan of evaporator 14 as indicated at 32. A second solenoid valve 33 is placed in line 30. Under normal conditions of operation (cooling cycle) valve 33 is closed. The port of valve 33 is selected to maintain desired evaporator temperature and pressure during the heating or defrosting operations. If desired, a suitable restriction (not shown) may be placed in line 30 between valve 33 and receiver 10 for that purpose. Valve 16 is in an open position during normal conditions of operation to permit flow of refrigerant through line 15. The refrigerant, after defrosting evaporator 14, returns to compressor 2 through line 19, separator-reevaporator 20, and line 21.

Considering the operation of the refrigeration system when it is employed to maintain the storage chamber 26 of trailer 27 at a predetermined cold temperature to preserve products stored therein, compressed gaseous refrigerant from compressor 2 passes through line 3 to condenser 4. Air blown through condenser 4 by fan 9 serves to condense refrigerant therein. The liquid refrigerant passes through line 11 to compartment 12 of receiver 10. Since valve 16 is open, refrigerant flows through line 15 to the evaporator, the supply of refrigerant to the evaporator being regulated by expansion valve 17. Fan 29 passes air from compartment 26 in heat exchange relation with refrigerant in evaporator 14 thereby cooling the air of the storage compartment while evaporating the refrigerant. The gaseous refrigerant passes through line 19 to reevaporator 20 and then returns to compressor 2 through line 21. This is normal operation when the refrigeration system is employed for cooling storage compartment 26.

Under some circumstances it may be desired to heat storage compartment 26 to maintain a desired temperature therein, or it may be desired to defrost evaporator 14 to thaw ice or frost collected on its exterior surfaces therefrom. Assuming it is desired to defrost the evaporator 14, solenoid valve 33 is opened and solenoid valve 16 is closed. Valves 16 and 33 may be operated by any suitable means, manually or automatically; preferably, a switch (not shown) is closed to actuate valves 16 and 33. During defrosting, it is desired to maintain an evaporator pressure corresponding to an evaporator temperature slightly above 32° F. so that refrigerant will condense in the evaporator thereby thawing the frost from the exterior surfaces of the evaporator.

Movement of the switch closes an electrical circuit (not shown) which actuates the solenoid valves. Opening of valve 33 permits hot gaseous refrigerant from compressor 2 to pass through line 30 to compartment 13 of receiver 10. The hot gaseous refrigerant in compartment 13 serves to heat any liquid refrigerant present in compartment 12 thereby evaporating the same and forcing the refrigerant to return through line 11 to condenser 4. It will be appreciated that receiver 10 may be designed in any suitable manner to assure that the hot gaseous refrigerant is placed in heat exchange relation with the liquid refrigerant.

In addition, of course, some gaseous refrigerant from compressor 2 continues to flow through line 3 to condenser 4. Thus, condenser 4 quickly fills with liquid refrigerant and is inactivated raising the compressor discharge pressure which provides more heat for defrosting and similarly raising the evaporator temperature and pressure to a point at which the gaseous refrigerant will condense in the evaporator. The hot gaseous refrigerant passes through line 31 in contact with the drip pan and drain of the evaporator 14 and then into line 15 being supplied to evaporator 14. The hot gaseous refrigerant is placed in heat exchange relation with the frost on the exterior surfaces of evaporator 14 thereby thawing frost collected on the exterior surfaces of the evaporator and condensing the refrigerant. The condensed liquid refrigerant together with any gaseous refrigerant still present passes through line 19 to separator-reevaporator 20. The gaseous and liquid refrigerant are separated in the upper portion of separator-reevaporator 20, the liquid falling to the lower portion thereof where it is in heat exchange relation with hot water passing through coil 22. Since the hot water from the engine cooling system passes through coil 22, any liquid refrigerant present in separator-reevaporator 20 is evaporated so that only gas returns to the compressor, such gas being at a somewhat higher temperature than would ordinarily be obtained. This procedure continues until the frost has been removed from the exterior surfaces of the evaporator. When the frost has been removed solenoid valves 16 and 33 are again actuated to open valve 16 and to close valve 33 permitting normal cooling operation of the refrigeration system to proceed. During normal operation of the refrigeration cycle, no liquid refrigerant is present in separator-reevaporator 20, so that coil 22 is in effect inactivated.

It will be appreciated the heating cycle is similar to the defrosting cycle described above except that fan 29 is operated.

It will be appreciated the port of valve 33 and lines 30 and 31 are suitably sized to permit discharge or head pressure to be increased during the defrosting or heating operation.

The refrigerant charge in the system is, of course, sufficient to fill condenser 4 and line 11 with liquid refrigerant during the defrosting or heating operation while providing sufficient gaseous refrigerant in the remainder of the system and liquid refrigerant in transit through the evaporator. The liquid capacity of separator-reevaporator 20 need be such as to hold any excess charge.

It will be understood any excess refrigerant charge will be drawn back through line 11, condenser 4, and line 3 into line 30 and thence through line 31, evaporator 14, line 19 to separator-reevaporator 20. The liquid will tend to desuperheat gaseous refrigerant in line 30 thereby reducing the temperature difference between gaseous refrigerant in compartment 13 of receiver 10 and liquid refrigerant in compartment 12 thereby slowing down the removal of excess refrigerant from compartment 12.

An important feature of the invention resides in the fact that the system is so designed that excess refrigerant charge passes into the evaporator. If the condenser were not inactivated, it would draw refrigerant from the evaporator and reduce the pressure therein below the condensing temperature at 32° F. Condensation in the evaporator, of course, depends upon sufficient refrigerant being present in the low side to maintain the desired evaporator temperature and pressure.

As pointed out above, receiver 10 is insulated to guard against loss of superheat in cold weather. In the present defrosting arrangement, the compressor serves primarily to circulate refrigerant. While it does add some heat, the chief means of adding heat is coil 22 in separator-reevaporator 20.

While I have shown a solenoid valve 16 in line 15, in the system described such valve functions primarily as a safeguard to assure that line 15 is closed securely during the heating or defrosting operation. If expansion valve 17 closes securely, valve 16 may be omitted.

To assist in understanding the flow of refrigerant through the refrigeration system I have placed arrows on those lines through which refrigerant flows during normal operation of the system. I have employed a dot-and-arrow to indicate flow of hot gaseous refrigerant when the system is operated on a defrosting or a heating cycle.

In Figure 2, I have shown a modification of the invention in which the solenoid valve 33 is placed in line 31 rather than in line 30. Solenoid valve 16 is omitted in the structure shown in Figure 2, reliance being placed upon expansion valve 17 to close securely during the defrosting operation. In this case too if there is insufficient refrigerant in the low side during defrosting, some liquid from the inactivated condenser 4 will be forced to the juncture of line 3 and line 30 and be carried through line 30 with the hot gaseous refrigerant thus desuperheating the hot gaseous refrigerant and slowing down the addition of further liquid, as explained in connection with Figure 1.

In Figure 3, a further modification of the invention is shown embodying the use of a capillary tube. The refrigeration system includes a compressor 50 connected to a condenser 51 by discharge line 52. Condenser 51 is connected to evaporator 53 by liquid line 54. Evaporator 53 is connected to separator-reevaporator 55 by suction line 56, separator-reevaporator 55 being connected to compressor 50 by line 57. Capillary tube 58 is placed in line 54 to regulate passage of refrigerant from condenser 51 to evaporator 53. A solenoid valve 59 is placed in line 54 between condenser 51 and capillary 58. Preferably, a capillary line 59 connects the bottom of separator-reevaporator 55 with a looped portion 57' of line 57 to permit oil connected in separator-reevaporator 55 to be returned to the compressor.

The compressor 50 is driven by an internal combustion engine 60 having its own cooling system which includes radiator 61 connected to engine 60 by lines 62 and 63. Fan 64 driven by engine 60 passes air through the radiator to cool water therein and through condenser 51 to condense refrigerant supplied therein through line 52.

Separator-reevaporator 55 contains in its lower portion a coil 65. Coil 65 is connected to the cooling system of engine 60 by lines 66 and 67. A solenoid valve 68 is placed in line 66 to close line 66 during normal operation of the system.

The evaporator 53, placed in casing 70, is disposed in the storage compartment 71 of a trailer 72. Fan 73 passes air from the compartment through the evaporator to cool the same.

A line 75 connects discharge line 52 with the evaporator 53. A solenoid valve 76 is placed in line 75.

The operation of this system essentially is the same as the operation of the system shown in Figure 1. Here, however, the separator-reevaporator 55 serves as an accumulator during normal operation so that solenoid valve 68 is provided to prevent hot water passing to coil 65 during normal operation. Valve 68 is actuated during the defrosting or heating operations similarly to valves 59 and 76.

While the invention has been described in connection with trailer or truck installations, it will be appreciated it is adapted for use with stationary installations. In stationary applications, since the range of condenser ambient temperatures is considerably less, the condenser, generally speaking, will not have the same need for complete inactivation during defrosting or heating cycles. Too, if desired, in such installations, the condenser may be water cooled.

The present invention provides a simple and ready means of defrosting a refrigeration system. It is particularly desirable in connection with the conditioning of storage compartments of vehicles such as trailers or trucks since it may be employed in conjunction with a direct-drive engine which operates continuously thereby eliminating an expensive control system which would ordinarily be required when it is necessary to turn the refrigeration system on and off. The invention assures that even during a defrosting or heating cycle only gaseous refrigerant returns to the compressor thus eliminating wear and tear on the valves of the compressor and reducign greatly the noise of compression.

An advantage of the present invention resides in the fact that the compressor discharge pressure is raised during the defrosting or heating cycles, thereby assuring that the compressor is completely loaded and making a greater amount of heat available for defrosting or heating purposes. Thus, during the defrosting or heating cycles, condensation of refrigerant is carried on in the evaporator to assure defrosting or heating. The invention assures sufficient refrigerant present in the low side of the system during defrosting to maintain evaporator pressure and temperature sufficiently high to permit condensation therein. Preferably, the high side of the refrigeration system including its actuating mechanism is mounted exteriorly of the storage compartment of the trailer, while the low side of the refrigeration system is mounted within the storage compartment of the trailer, the two sides being connected by lines extending through the wall of the trailer.

While I have described a preferred embodiment of the invention, it will be understood the invention is not limited thereto since it may be otherwise embodied within the scope of the following claims.

I claim:

1. In a refrigeration system, the combination of a compressor, a condenser, a heating member serving when the condenser is inactivated to evaporate liquid refrigerant in said member for return to the condenser, expansion means, and an evaporator, placed in a closed circuit in said order, means for evaporating liquid refrigerant in the evaporator during normal operation of the system thereby creating frost on the exterior surfaces of the evaporator, and means for inactivating the condenser by substantially filling the condenser with liquid refrigerant to raise the evaporator pressure and temperature thereby condensing gaseous refrigerant in the evaporator to thaw frost from the evaporator surfaces.

2. A refrigeration system according to claim 1 in which a second heating member is provided between the evaporator and the compressor to change the state of the condensate prior to return to the compressor.

3. In a refrigeration system, the combination of a compressor, a condenser, a heating member, expansion means, and an evaporator placed in a closed circuit in such order, means for evaporating liquid refrigerant in the evaporator during normal operation of the system thereby creating frost on the exterior surfaces of the evaporator, means for inactivating the condenser including a line connecting the compressor discharge with the evaporator to raise the evaporator pressure and temperature thereby condensing gaseous refrigerant therein to thaw frost from the evaporator surfaces, a second heating member to change the state of the refrigerant condensate prior to return to the compressor and including an internal combustion engine having a water cooling arrangement to drive the compressor, hot water from the engine passing through the second heating member in heat exchange relation with condensate to vaporize the same.

4. In a refrigeration system, the combination of a compressor, a condenser, a first line connecting the condenser with the compressor, a receiver, a second line connecting the condenser with the receiver, a third line connecting the receiver with an evaporator, expansion means placed in said third line to regulate flow of refrigerant to the evaporator, a fourth line connecting the evaporator with the compressor, a conduit attached to said first line to conduct gaseous refrigerant from the first line in heat exchange relation with liquid refrigerant in the receiver, a second conduit conducting refrigerant from the first conduit to the third line at a point intermediate the expansion means and the evaporator, a control member in said first conduit, said control member being closed during normal operation of the refrigeration system while, during conditions requiring defrosting of the evaporator, said control member is open permitting passage of hot gaseous refrigerant from the compressor through said conduits to the evaporator to defrost the same, refrigerant after defrosting the evaporator returning to the compressor and being recirculated until defrosting is completed.

5. In a refrigeration system, the combination of a compressor, a condenser, a first line connecting the condenser with the compressor, a receiver, a second line connecting the condenser with the receiver, a third line connecting the receiver with an evaporator, a control member in said third line to regulate passage of refrigerant therethrough, expansion means placed in said third line to regulate flow of refrigerant to the evaporator, said expansion means being placed between said control member and said evaporator, a reevaporator shell, a fourth line connecting the evaporator with the reevaporator shell, means for heating refrigerant in said reevaporator shell, a fifth line connecting the reevaporator with the compressor, a conduit to conduct hot gaseous refrigerant from first line in heat exchange relation with liquid refrigerant in the receiver, a second conduit conducting refrigerant from the first conduit to the third line at a point intermediate the expansion means and the evaporator, a second control member in said first conduit, said first control member being open and said second control member being closed during normal operation of the refrigeration system while, during conditions requiring defrosting of the evaporator, said second control valve is open and said first control valve is closed permitting passage of hot gaseous refrigerant from the compressor through said conduits to the evaporator to defrost the same, refrigerant after defrosting the evaporator returning to the compressor and being recirculated until defrosting is completed.

6. In a refrigeration system, the combination of a compressor, a condenser, a first line connecting the condenser with the compressor, a receiver, a second line connecting the condenser with the receiver, a third line connecting the receiver with an evaporator, a first control member in said third line to regulate passage of refrigerant therethrough, expansion means placed in said third line to regulate flow of refrigerant to the evaporator, said expansion means being placed between said control member and said evaporator, a reevaporator shell, a fourth line connecting the evaporator with the reevaporator shell, means for heating refrigerant in said reevaporator shell, a fifth line connecting the reevaporator with the compressor, a conduit to conduct hot gaseous refrigerant from first line in heat exchange relation with liquid refrigerant in the receiver, a second conduit conducting refrigerant from the first conduit to the third line at a point intermediate the expansion means and the evaporator, a second control member in said first conduit, said first control member being open and said second control member being closed during normal operation of the refrigeration system while, during conditions requiring defrosting of the evaporator, said second control member is open and said first control member is closed permitting passage of hot gaseous refrigerant from the compressor through said conduits to the evaporator to defrost the same, refrigerant after defrosting the evaporator returning to the compressor and being recirculated until defrosting is completed, the receiver containing separate compartments, the second line passing through one of said compartments and placing the condenser in communication with another of said compartments, the first conduit connecting the first line with another of said receiver compartments to place refrigerant in said compartments in heat exchange relation.

7. A refrigeration system according to claim 4 in which during the defrosting cycle the condenser is filled with liquid refrigerant to increase compressor discharge pressure.

8. In a defrosting arrangement for a refrigeration system, the combination of a compressor, a condenser, a receiver having two chambers, the condenser being connected to the compressor and to the first chamber of the receiver, an evaporator, means for supplying hot gaseous refrigerant to the evaporator, hot gaseous refrigerant supplied to the evaporator passing through the second chamber of the receiver in heat exchange relation with liquid refrigerant in the first chamber of the receiver to return the same to the condenser, and means for inactivating the condenser by substantially filling the condenser with liquid refrigerant to raise compressor discharge pressure to increase evaporator temperature and pressure thereby condensing refrigerant in the evaporator to defrost the same.

9. A defrosting arrangement according to claim 8, in which a reevaporator is provided in the line connecting the evaporator and the compressor to evaporate liquid refrigerant returning to the compressor during the defrosting cycle.

10. In combination with a vehicle such as a trailer or truck containing a storage compartment, means for conditioning the compartment, said means including a refrigeration system having a compressor, a condenser, a first line connecting the condenser with the compressor, a receiver, a second line connecting the condenser with the receiver, a third line connecting the receiver with an evaporator, expansion means placed in said third line to regulate flow of refrigerant to the evaporator, a fourth line connecting the evaporator with the compressor, a conduit attached to said first line to conduct hot gaseous refrigerant from the first line in heat exchange relation with liquid refrigerant in the receiver, a second conduit conducting refrigerant from the first conduit to the third line at a point intermediate the expansion means and the evaporator, a control member in said first conduit, said control member being closed during normal operation of the refrigeration system while, during conditions requiring heating of the evaporator, said control member is open permitting condensation of hot gaseous refrigerant from the compressor in the evaporator to supply heat thereto.

11. In combination with a vehicle such as a trailer or truck containing a storage compartment, means for conditioning the compartment, said means including a refrigeration system having a compressor, a condenser, a first line connecting the condenser with the compressor, a receiver, a second line connecting the condenser with the receiver, a third line connecting the receiver with an evaporator, a control member in said third line to regulate passage of refrigerant to the evaporator, expansion means placed in said third line to regulate flow of refrigerant to the evaporator, said expansion means being placed in said third line between the control member and the evaporator, a reevaporator shell, a fourth line connecting the evaporator with the reevaporator shell, heating means for heating refrigerant in said reevaporator shell, a fifth line connecting the reevaporator with the compressor, a conduit attached to said first line and connecting the first line with the receiver, a second conduit connecting the first conduit with the third line at a point intermediate the expansion means and the evaporator, a second control member in said first conduit, said first control member being open and said second control member being closed during normal operation of the refrigeration system while, during conditions requiring heating of the evaporator, said second control valve is open and said first control valve is closed permitting passage of hot gaseous refrigerant from the compressor through said conduits to the evaporator to place the hot gaseous refrigerant in heat exchange relation with air in said compartment thereby heating the same.

12. In combination with a vehicle such as a trailer or truck containing a storage compartment, means for conditioning the compartment, said means including a refrigeration system having a compressor, a condenser, a first line connecting the condenser with the compressor, a receiver, a second line connecting the condenser with the receiver, a third line connecting the receiver with an evaporator, a first control member in said third line to regulate passage of refrigerant to the evaporator, expansion means placed in said third line to regulate flow of refrigerant to the evaporator, said expansion means being placed in said third line between the control member and the evaporator, a reevaporator shell, a fourth line connecting the evaporator with the reevaporator shell, heating means for heating refrigerant in said reevaporator shell, a fifth line connecting the reevaporator with the compressor, a conduit attached to said first line and connecting the first line with the receiver, a second conduit connecting the first conduit with the third line at a point intermediate the expansion means and the evaporator, a second control member in said first conduit, said first control member being open and said second control member being closed during normal operation of the refrigeration system while, during conditions requiring heating of the evaporator, said second control member is open and said first control member is closed permitting passage of hot gaseous refrigerant from the compressor through said conduits to the evaporator to place the hot gaseous refrigerant in heat exchange relation with air in said compartment thereby heating the same, the receiver containing a plurality of compartments, said second line passing through one of said compartments and placing the condenser in communication with another of said compartments, the first conduit connecting the first line with the second receiver compartment and the second conduit connecting the second compartment with the evaporator.

13. Apparatus according to claim 11 in which an internal combustion engine is provided to drive the compressor, liquid cooling means are provided for said engine, liquid heated after passage in heat exchange relation with said engine being directed to the reevaporator to pass in heat exchange relation with liquid refrigerant therein.

14. In the method of operation of a refrigeration system, the steps which consist in compressing gaseous refrigerant, condensing the gaseous refrigerant, evaporating the condensed refrigerant in heat exchange relation with a medium to cool the same, then, when frost has collected on the evaporating surfaces, filling the condenser with liquid refrigerant to increase the compressor discharge pressure thereby increasing the temperature of the compressed gaseous refrigerant, passing the hot gaseous refrigerant in heat exchange relation with the evaporating surfaces to thaw frost therefrom, continuing the process until the frost is removed from the evaporating surfaces, discontinuing the passage of hot gaseous refrigerant in heat exchange relation with the evaporating surfaces, and resuming the steps of cooling the medium.

15. A method of operation of a refrigeration system according to claim 14 in which refrigerant leaving the evaporator during the defrosting cycle is heated to assure it is in gaseous form.

16. In the method of operation of a refrigerating system, the steps which consist in compressing gaseous refrigerant, condensing the gaseous refrigerant, evaporating the condensed refrigerant in heat exchange relation with a medium to cool the same, then, when frost has collected on the evaporating surfaces, filling the condenser with liquid refrigerant to increase the compressor discharge pressure thereby increasing the temperature of the compressed gaseous refrigerant, passing gaseous refrigerant in heat exchange relation with the evaporating surfaces thereby condensing the refrigerant, evaporating the condensate and returning the evaporated refrigerant to the compressor.

References Cited in the file of this patent
UNITED STATES PATENTS

| Number | Name | Date |
|---|---|---|
| 1,665,878 | Glassel | Apr. 10, 1928 |
| 2,218,793 | Horton | Oct. 22, 1940 |
| 2,430,960 | Soling | Nov. 18, 1947 |
| 2,455,421 | Kirkpatrick | Dec. 7, 1948 |
| 2,526,379 | Maseritz | Oct. 17, 1950 |
| 2,546,723 | Clark | Mar. 27, 1951 |
| 2,564,310 | Nussbaum et al. | Aug. 14, 1951 |
| 2,611,587 | Boling | Sept. 23, 1952 |
| 2,645,101 | La Porte | July 14, 1953 |